United States Patent [19]

Higashimura et al.

[11] 3,892,704

[45] July 1, 1975

[54] PROCESS FOR PRODUCING HARDENED CEMENT MATERIAL

[75] Inventors: Einosuke Higashimura, Tokyo; Yasunobu Miura, Yokohama, both of Japan

[73] Assignee: Mitsubishi Rayon Co., Ltd., Japan

[22] Filed: May 29, 1973

[21] Appl. No.: 364,417

Related U.S. Application Data

[62] Division of Ser. No. 92,921, Nov. 25, 1970, abandoned.

[30] Foreign Application Priority Data

Nov. 26, 1969 Japan.............................. 44-94780

[52] U.S. Cl....... 260/29.6 S; 260/29.7 S; 260/42.13
[51] Int. Cl. .............................................. C08f 45/24
[58] Field of Search ......... 260/41 R, 29.6 S, 29.7 S, 260/42.13; 106/90, 314, 315

[56] References Cited
UNITED STATES PATENTS

| | | | |
|---|---|---|---|
| 2,390,138 | 12/1945 | Vallandigham..................... | 106/315 |
| 2,745,813 | 5/1956 | Logemann..................... | 260/29.6 S |
| 3,210,207 | 10/1965 | Dodson.............................. | 106/90 |
| 3,366,502 | 1/1968 | Lombardo......................... | 106/314 |
| 3,437,619 | 4/1969 | Nutt.............................. | 260/29.6 S |
| 3,511,313 | 5/1970 | Eilers.............................. | 260/29.6 S |
| 3,538,036 | 11/1970 | Peters............................. | 260/29.6 S |
| 3,580,879 | 5/1971 | Higashimura..................... | 260/41 R |
| 3,689,294 | 9/1972 | Braunauer......................... | 106/90 |

*Primary Examiner*—Joseph L. Schofer
*Assistant Examiner*—P. R. Michl
*Attorney, Agent, or Firm*—Armstrong, Nikaido & Wegner

[57] ABSTRACT

A cement material comprising a base material consisted of cement or of cement and aggregates, mixing water, 2 to 30 % by weight (based on the water) of a water-soluble ethenoid monomer, and 0.02 to 20 % by weight (based on the water) of a water-soluble cross-linking monomer, is cured with a redox catalyst system in the presence of a water-soluble inorganic compound of an alkali metal to obtain a hardened cement material of polymer-alkali metal compound-cement combination. According to this process, curing and hardening proceed rapidly and independent of curing conditions, such as atmospheric curing, water-curing, or steam-curing. Compared with conventional hardened cement materials, the present hardened material has higher mechanical strengths, such as bending, tensile, compressive, impact, adhesive strengths, and higher chemical stability, waterproofness, etc.

11 Claims, No Drawings

PROCESS FOR PRODUCING HARDENED CEMENT MATERIAL

This is a division of application Ser. No. 92,921, filed Nov. 25, 1970, now abandoned.

The present invention relates to a process for producing hardened cement materials.

With the rapid progress in modern civil and architectural engineerings an improvement in performances has been required for various construction materials. Whereas hardened cement produced from cement paste, cement mortar, concrete, or the like, has an exceedingly high compressive strength, it has a number of fundamental defects such as extremely low tensile, bending and impact strengths, poor toughness, britteness, low abrasion resistance, and insufficient chemical stability (stability against sea water and chemicals such as acids, alkalis, etc.).

As one of the results of many researches heretofore carried out to improve the above-said defects of the hardened cement, a cement material incorporated with organic polymers, which is called polymer-cement mortar or polymer-concrete, has been commercialized and the use development thereof is now in active progress.

It is well known that in comparsion with the ordinary cement mortar and concrete, hardened materials of the polymer-cement type, such as polymer-cement mortar and polymer-concrete, have advantageous properties characterized by markedly increased tensile, bending, impact and adhesive strengths, an excellent chemical stability and water-proofing property, and an exceedingly small tendency of developing efflorescence (efflorescence is caused by alkaline substances in a hardened cement).

The present inventors have long been engaged materials, whereby the polymer is suitably formed in said materials. It was in researches on the method for rapid hardening of cement materials by adding a water-soluble ethenoid monomer, a water-soluble monomer capable of cross-linking, and a redox catalyst in the mixing water to form a solution which is used in producing the hardened cement materials. It was found that by use of this method the construction period can be shortened owing to the possible early removal of mold forms after depositing of the cement materials in a construction work, and the moldability may be improved in producing in the mold a Hume pipe, various blocks, and a prestressed concrete sheet pile because the separation of water and the segregation of aggregates in mortar and concrete are suppressed in centrifugal molding, vibration molding and compression molding. It was further found that by use of said method the workability of a cement mortar or a concrete in spray applications may be improved so that the slipping down and falling off can be prevented and even the spring water and leaking water can be stopped by spraying said cement materials.

However, contrary to the ordinary cement mortar or concrete, which does not contain additives, (called "plain mortar" or "plain concrete"), these hardened materials of the polymer-cement type were found to have such a disadvantage that unless atmosphere-cured they are unable to develop the above-said mechanical strength properties that are characteristic to the polymer-cement combination, and when they were wet-cured, especially water-cured or steam-cured, the mechanical strengths become even inferior to those of a plain mortar and plain concrete because the hydration and hardening of the cement were prevented on account of the water adsorption, swelling, and decomposition of the polymer taken place during the wet curing.

Therefore, in the case where wet-curing is unavoidable in applying the above-said hardened material of the polymer-cement type for the concrete depositing in construction work, such as the case, for example, where the concrete must be deposited and cured under water, the material was unsuitable for the practical use, because even though the construction work was quickened on account of early removal of the mold forms the long term strength of the resulting hardened cement structure was found to be inferior to that of the plain mortar or plain concrete.

In the production of molded cement articles, steam-curing is an indispensable step because in a period of time as short as possible the placed cement must be cured to the point of maximum strength, stripped of the mold, and shipped in order to increase the frequency of repeated use of the molds and to increase the productivity. The use of said polymer-cement combination in such a case proved entirely unsuccessful because the molded articles were broken when stripped of the mold or during transportation on account of much inferior development of the early strength in steam-curing, compared with that of plain mortar or plain concrete, although the moldability of the cement was improved and the molded articles were produced in more accurate dimensions.

A further disadvantage of the conventional hardened material of the polymer-cement type, which has posed a serious problem, is its inferior dimentional stability, particularly the large shrinkage during atmospheric curing and steam curing, which causes fluctuations in shapes and dimensions of the molded products, and which tends to induce cracks in general structures.

Thus, in spite of the essentially distinguished performance of the hardened material of the polymer-cement type shown in mechanical characteristics and in improvement of the workability, its actual use has been limited to a very narrow range where atmospheric curing is possible under a suitable temperature and humidity and where a good dimentional stability is not particularly required.

An object of the present invention is to develop a broad expense of uses of the conventional polymer-cement type hardened material by improving the quality thereof so that the characteristic properties of said material become independent of curing conditions, and the characteristic mechanical strengths may be fully developed and, at the same time, the dimentional stability may be improved not only by atmospheric curing but also by water-curing and steam curing, both of which have generally been used in curing of an ordinary cement mortar and concrete.

This invention relates to a process for producing hardened cement materials, which is characterized in that the basic material comprising cement or cement and aggregate are hardened in the presence of water, a water-soluble ethenoid monomer, water-soluble cross-linking monomer, redox catalyst, and a water-soluble inorganic compound of an alkali metal. The excellent characteristics of the thus obtained hardened material of the polymer-alkali metal compound-cement type are developed neither as a result of formation of a simple composite material from a combination of an organic polymer and a hardened cement hydrate, as is the case with conventional polymer-cement type hardened material, nor by a simple combination of an inorganic compound of an alkali metal and a hardened cement hydrate, as is evident from the results in Examples given hereinafter, but are developed only by the synergetic effect of the three-membered combination of an organic polymer, an inorganic compound of an alkali metal, and a hardened cement hydrate.

The hardened cement material according to the present invention not only exhibits properties far superior to those of the conventional hardened material of the polymer-cement type in the use area where the latter material has been practically used, but also exhibits excellent and faultless characteristics of mechanical strengths, dimensional stability and workability in the use areas where the conventional hardened cement-polymer material fails to fully exhibit its mechanical strengths and other characteristics, such as the area where wet curing, for example water curing or steam curing, is unavoidable, or the area where a good dimensional stability is required.

According to the present invention, in the production of, for example, molded articles, compared with an ordinary mortar and concrete not only the workability of the present material is better, but also the development of normal strength is quicker so that the steam-curing time that is necessary to develop sufficient strength for mold stripping and transportation of the molded articles may be reduced, whereby the frequency of repeated use of the molds and molding machine is increased to improve the productivity.

As the water-soluble ethenoid monomers for use in this invention, may be mentioned, for example, acrylamide, N-methylolacrylamide, methacrylamide, N-methylolmethacrylamide, acrylonitrile, hydroxymethyl methacrylate, methacrylic acid and its metal salts, acrylic acid and its metal salts, etc, Among these monomers, particularly preferred are acrylamide or a mixture comprising acrylamide as the principal component and a small amount of either or both of sodium acrylate and sodium methacrylate.

As the water-soluble cross-linking monomers, may be mentioned, for example, methylenebisacrylamide, 1,3-di(acrylamidomethyl)-2-imidazolidone, 1,3-di(methacrylamidomethyl)-2-imidazolidone, hexahydrotriacryloyl triazine, and unsaturated amides containing dimethylene ether linkage such as diacrylamide dimethyl ether, dimethacrylamide dimethyl ether, etc. Among these compounds, particularly preferred are 1,3-di(acrylamidomethyl)-2-imidazolidone, 1,3-di(methacrylamidomethyl)-2-imidazolidone and methylenebisacrylamide.

Each of the above-said ethenoid monomers and cross-linking monomers is used solely or in a mixture of two or more.

The water-soluble ethenoid monomer is used in this invention in an amount of generally 2 to 30 %, preferably about 2.5 to 6.0 % by weight based on the amount of water used for mixing the cement paste, mortar or concrete. The use of less than 2 % of monomer will show no notable effect, and the use of more than 30 % will not appreciably add to the effect and is, therefore, uneconomical.

The cross-linking monomer is used in an amount of generally 0.02 to 20 %, preferably about 0.1 to 10 % by weight based on the weight of water used for mixing the cement paste, mortar or concrete. The use of less than 0.02 % of the monomer will not cause sufficient cross-linkages to achieve the object of the addition, whereas the use of more than 20 % will not appreciably add to the effect or, on some occasions, even results in decrease of the strength.

As the redox catalyst system in this invention may be used any known combination. Potassium persulfate or ammonium persulfate is suitable as the oxidative component. Examples of the suitable reducing component include triethylenetetramine, hexamethylenedianine, dimethylaminopropanol nitrilotrispropionamide, β-diemthylaminoethanol, β-dimethlyaminoproprionitrile, β-diketone, sodium formaldehydosulfoxylate, etc.

The amount of these catalysts used is a catalytic quantity, and is, in general, about 1 to 30 % by weight based on the polymerizable components, depending upon the combination of oxidative and reducing components.

The water-soluble inorganic compounds of alkali metals used in this invention are, for example, alkali metal oxides, hydroxides, fluorides, iodides, thiocyanates, sulfides, aluminates, carbonates, silicates, stannates, orthophosphates, tripolyphosphates, arsenites, chromates, bichromates, molybdates, tungstates, sulfates, metasulfites, pyrosulfates, manganates, phosphomolybdates, phosphotungstates, and aluminum alum etc. Particularly effective compounds are carbonates, chromates, bichromates, tungstates, sulfates, and aluminum potassium sulfate, chromium (III) potassium sulfate, including specifically sodium sulfate, sodium carbonate, potassium sulfate, sodium bichromate, sodium tungstate, etc.

The suitable amount of these water-soluble inorganic compounds of an alkali metal to be used is about 0.5 to 10 % by weight of an oxide or a hydroxide, or about 2 to 40 % by weight of other alkali metal compounds, based on the amount of water used for mixing the cement paste, mortar or concrete. These alkali metal compounds will show no notable effect when used in an amount outside the given ranges.

The embodiment of the present invention may be realized in various manners, and one of the effective embodiment, for example, is as follows: The water to be used for mixing cement paste, mortar, or concrete is divided into two parts, the one of which is used to make a principal solution by being added with the ethenoid monomer, cross-linking monomer, and the reducing component of the redox catalyst, and the other is used to make a curing initiator solution containing the oxidation component of the redox catalyst system and the inorganic alkali metal compound. These two solutions prepared in advance are mixed and added to the cement paste, mortar or concrete at the time of mixing.

The time of polymerization initiation of the monomers, i.e., the setting time of the cement paste, mortar or concrete, may be suitably controlled by proper selection of the combination of redox catalyst components and the quantity thereof.

The invention is further illustrated below in detail with reference to examples, in which all parts and percentages are by weight. The sand and gravel used in examples had a particle size distribution as shown in Table A, and the cement used was an ordinary portland cement composition as shown in Table B.

Table A

| | Particle size distribution of sand and gravel | |
|---|---|---|
| | Size of particle | Weight % |
| Sand | (Fine aggregates) | |
| | 0.074 – 0.1 mm | 6 |
| | 0.1 – 0.2 mm | 69 |
| | 0.2 – 0.3 mm | 23 |
| | 0.3 – 0.4 mm | 1 |
| | 0.4 – 0.5 mm | 1 |
| Gravel | (Coarse aggregates) | |
| | 1 – 5 mm | 9 |
| | 5 – 10 mm | 46 |
| | 10 – 20 mm | 43 |
| | 20 – 25 mm | 2 |

Table B

| Components | Composition of cement Weight % |
|---|---|
| Ignition loss | 0.4 |
| Insoluble | 0.4 |
| $SiO_2$ | 22.1 |
| $Al_2O_3$ | 5.2 |
| $Fe_2O_3$ | 2.9 |
| CaO | 65.3 |
| MgO | 1.3 |
| $SO_3$ | 1.7 |

EXAMPLE 1

According to the method of J.I.S R-5201-1964, "Test of Strength" (the term "J.I.S." is an abbriviation of Japan Industrial Standard), each of the mortar samples of the proportions given in Table 1 was placed in a steel mold (a triple mold for making 3 square rods, 4.0 cm × 4.0 cm × 16.0 cm each). After two hours each mold containing the mortar was transferred into a steamcuring cabinet at 65°C. After 5 hours of curing the mold was taken out of the curing cabinet, and immediately thereafter the cured specimen was stripped of the mold. The compressive strength of the specimen was measured immediately after stripping of the mold and after 6 weeks by means of a testing machine of the hydraulic pendulum dynamometer type. During said 6 weeks after stripping of mold the specimen had been atmospherecured in a cabinet at 20°C and 65 % humidity. The results of determination of the strength were as shown in Table 2.

Table 1

| Hardened material | Cement part | Sand part | Proportions of mortar Mixing water, part | | |
|---|---|---|---|---|---|
| Plain mortar | 100 | 300 | water | 40 parts | |
| Polymer-mortar | 100 | 300 | Principal solution : Acrylamide Sodium methacrylate Sodium acrylate Methylenebisacrylamide -Dimethylaminopropionitrile Water Initiator solution : Potassium persulfate Water | 0.10 0.10 0.10 0.15 0.20 18.35 0.20 19.80 | The two solutions were mixed and used for mixing mortar. |
| Mortar with both polymer and inorganic compound | 100 | 300 | Two solutions with the same compositions as those of above principal solution and initiator solution were prepared. 5 Parts of the inorganic compound was dissolved in the initiator solution. Mixture of the two solutions was used for mixing mortar. | | |
| Mortar with inorganic compouns | 100 | 300 | 5 Parts of the inorganic compound was dissolved in 40 parts of water, and the solution was used for Mixing mortar. | | |

Table 2.

Comparison of the effect of addition of various inorganic compounds

| Inorganic compound added | (A) Compressive strength of mortar with inorganic compound, $kg/cm^2$ | | (B) Compressive strength of mortar with both polymer and inorganic compound, $kg/cm^2$ | | (B)/(A) | | Remark |
|---|---|---|---|---|---|---|---|
| | Immediately after steam-curing | After 6 weeks | immediately after steam-curing | After 6 weeks | Immediately after steam-curing | After 6 weeks | |
| $NaHSO_4$ | 101 | 256 | 139 | 340 | 1.38 | 1.33 | |
| $Na_2CO_3$ | 70 | 159 | 128 | 280 | 1.88 | 1.76 | Present invention |
| $NaAlO_2$ | 45 | 103 | 93 | 266 | 2.06 | 2.53 | |
| $K_2[Sn(OH)_6]$ | 75 | 164 | 88 | 267 | 1.17 | 1.63 | |
| $Na_3PO_4 \cdot 12H_2O$ | 47 | 156 | 53 | 260 | 1.13 | 1.67 | |
| $Mg(NO_3)_2 \cdot 6H_2O$ | 37 | 206 | 10 | 203 | 0.27 | 1.01 | Reference |

Note:
The strength of the plain mortar admixed with neither inorganic compound nor polymer, and that of the polymer-mortar containing only polymer were as shown in the following table.

|  | Immediately after steam-curing, kg/cm² | After 6 weeks, kg/cm² |
|---|---|---|
| Plain mortar | 86 | 254 |
| Polymer-mortar | 10 | 210 |

It is seen from the test results shown in Table 2 that the mortar admixed with a combination of polymer and an inorganic compound of an alkali metal has remarkably higher strength than that of the plain mortar containing no admixture, that of the polymer-mortar admixed with the polymer only, and that of the inorganic compound-admixed mortar admixed with the inorganic compound only. It is also seen that the strength is never improved by use of a combination of the polymer and a magnesium compound.

It is clear from the observed values shown in the above table that such an improvement in strength is due to the synergetic effect of the combination of polymer and the inorganic compound.

ing strength and compressive strength were measured according to the method of J.I.S R-5201-1964, Test of Strength, immediately after stripping of the mold and after atmospheric curing for 4 weeks (at 20°C, and 65 % humidity). The change in length of the specimen was also determined according to J.I.S A-1124-1957, "Method of Testing Change in Length of Mortar."

$$\text{Change in length (\%)} = \frac{\text{length of the hardened material after 4 weeks of curing} - \text{length of the mold}}{\text{(length of the mold)}} \times 100.$$

The results obtained were as shown in Table 3.

Table 3

| Kind of hardened material | Proportions | | | | Water, part | Strengths immediately after stripping of mold | | Strengths after 4 weeks | | Change in length (%) |
|---|---|---|---|---|---|---|---|---|---|---|
| | Water-soluble ethenoid monomer, part | Water-soluble cross-linking monomer, part | Redox catalyst, part | Inorganic compound | | Bending strength, kg/cm² | Compressive strength, kg/cm² | Bending strength, kg/cm² | Compressive strength, kg/cm² | |
| Plain mortar | — | — | — | — | 60 | 21 | 70 | 45 | 205 | −0.01 |
| Polymer-mortar | | | | — | 57.3 | 2 | 6 | 46 | 145 | −0.55 |
| Mortar with both polymer and inorganic compound | Acrylamide 1.88 | 1,3-Di(acrylamidomethyl)-2-imidazolidone 0.32 | β-Dimethylaminopropionitrile 0.24 Potassium persulfate 0.36 | Li₂SO₄.H₂O | | 49 | 170 | 73 | 290 | −0.005 |
| | | | | Li₂CrO₄.2H₂O | 57.3 | 44 | 164 | 67 | 268 | −0.01 |
| | | | | Na₂CO₃ | | 38 | 94 | 62 | 245 | −0.01 |
| | | | | K₂WO₄.2H₂O | | 27 | 87 | 62 | 238 | −0.01 |
| | | | | AlCl₃.6H₂O | | 2 | 8 | 45 | 150 | −0.05 |
| | | | | CuSO₄ | 57.3 | 0.3 | 2 | 32 | 130 | −1.25 |
| | | | | Mg(NO₃)₂.6H₂O | | 0.6 | 3 | 33 | 133 | −0.56 |
| | | | | Ba(OH)₂.8H₂O | | 0.9 | 3 | 35 | 142 | −0.50 |

EXAMPLE 2

According to the method of J.I.S R-5201-1964, Test of Strength, a cement material comprising 100 parts of cement and 300 parts of sand was admixed with a water-soluble ethenoid monomer, water-soluble cross-linking monomer, redox catalyst, and 5 parts of the inorganic compound, together with water, in proportions given in Table 3, and the mixture was molded in the same mold as that used in Example 1. After 2 hours the mold containing the mortar was transferred into a steam-curing cabinet at 65°C. After 4 hours of curing the cured mortar was stripped of the mold to obtain a hardened cement material (cement mortar). The bend- Under such steam-curing conditions as those in this Example, the early strength of the polymer-mortar immediately after steam-curing is as low as one-tenth that of the plain mortar cured under the same conditions, whereas when an inorganic compound of an alkali metal has been added to said mortar the early strength becomes far higher than that of the polymer-mortar, even much higher than that of the plain mortar, and at the same time the dimensional stability is improved. It is noteworthy that the bending strength, which greatly contributes to the overall strength, is remarkably increased.

After 4 hours of steam-curing the strength of the mortar admixed with both polymer and an inorganic compound, such as lithium sulfate, lithium chromate, or the like, already exceeds the strength of the ordinary mortar (plain mortar) after an overnight steam-curing (wherein the temperature is raised at a rate of about 15°C per hour to 65°C, maintained at this temperature for about 5 hours, and then the temperature is lowered gradually to room temperature), which is a usual procedure in the production of molded articles.

Therefore, when the mortor admixed with both polymer and an inorganic compound of an alkali metal is employed in the production of molded articles the productivity will be greatly improved.

On the other hand, when an inorganic compound of a metal other than alkali metals is used, there will be expected almost no effect or even decreased strength, as is seen from the results shown in Table 3.

EXAMPLE 3

According to J.I.S A-1132-1963, "Method of Preparing a Specimen for Test of Strength of Concrete," a cement material comprising 100 parts of cement, 244 parts of sand, and 327 parts of gravel was admixed with the monomers, catalyst, and 5 parts of the inorganic compound, together with water, as shown in Table 4, and the mixture was molded to make a concrete specimen. After two hours the mold containing the concrete specimen was transferred into a steam-curing cabinet. The temperature of the curing cabinet was raised at a rate of 15°C per hour to 65°C, maintained at this temperature for 5 hours, and then steam was shut off. The concrete specimen was left in the cabinet to be cooled to obtain a hardened concrete specimen. When the steam was shut off, the temperature in the curing cabinet fell at a rate of 6 to 10°C per hour to atmospheric temperature (25°C).

Twenty four hours after completion of the molding, the mold was taken out of the curing cabinet. The hardened material was stripped of the mold, and the compressive strength and bending strength were measured according to J.I.S A-1108 and J.I.S A-1106 on each hardened material.

Further, the specimen was atmosphere-cured for 4 weeks in a room at 20°C and 65 % humidity. Then the compressive strength and bending strength were measured again.

The results obtained were as shown in Table 4.

Table 4

| Kind of hardened material | water-soluble ethenoid monomer, part | Water-soluble cross-linking monomer, part | Redox catalyst, part | Inorganic compound | Water, part | Strength immediately after stripping of mold | | Strength after 4 weeks | |
|---|---|---|---|---|---|---|---|---|---|
| | | | | | | Bending strength, kg/cm² | Compressive strength, kg/cm² | Bending strength, kg/cm² | Compressive strength, kg/cm² |
| Plain concrete | — | — | — | — | 60 | 28 | 107 | 48 | 259 |
| Polymer-concrete | | | | — | 57.7 | 13 | 41 | 38 | 155 |
| Concrete with both polymer and inorganic compound | Acrylamide 1.26 Sodium methacrylate 0.18 | Methylene-bisacrylamide 0.24 | β-Dimethyl-aminepropionitrile 0.30 Potassium persulfate 0.36 | $K_2CO_3$ | 57.7 | 42 | 142 | 71 | 356 |
| | | | | $Na_2CrO_4 \cdot 10H_2O$ | | 50 | 170 | 79 | 392 |
| | | | | $Na_2Cr_2O_7 \cdot 2H_2O$ | | 36 | 137 | 57 | 294 |
| | | | | $Na_2WO_4 \cdot 2H_2O$ | | 46 | 163 | 75 | 390 |
| | | | | $K_2SO_4$ | | 49 | 154 | 77 | 384 |
| | | | | $Na_2Al_2(SO_4)_4 \cdot 24H_2O$ | | 44 | 132 | 70 | 366 |
| | | | | $FeCl_3 \cdot 4H_2O$ | 57.7 | 10 | 29 | 33 | 148 |
| | | | | $Pb(NO_3)_2$ | | 3 | 9 | 35 | 160 |
| | | | | $CoSO_4 \cdot 7H_2O$ | | 7 | 21 | 29 | 142 |
| | | | | $SnCl_2 \cdot 2H_2O$ | | 8 | 21 | 39 | 159 |
| | | | | $Al(NO_3)_3 \cdot 9H_2O$ | | 14 | 39 | 40 | 156 |

In this Example, various concretes were steam-cured for a long time. Similarly to the case of mortar in the preceeding Example, it is evident that the strength of the concrete material admixed with only polymer was much lower than that of an ordinary concrete (plain concrete), whereas the concrete material admixed with both polymer and an inorganic compound of an alkali metal had developed excellent strength characteristics even after a long hour of steam-curing.

EXAMPLE 4

In the manner similar to that in Example 1, various mortar samples shown in Table 5 were molded and cured in water at 20° ± 3°C to obtain hardened materials.

The bending strength and compressive strength of the hardened materials obtained were as shown in Table 5.

Table 5

Mix proportions and strengths of various mortars

| Kind of hardened material | Proportions | | | Bending strength, kg/cm² | | | | Compressive strength, kg/cm² | | | |
|---|---|---|---|---|---|---|---|---|---|---|---|
| | Cement, part | Sand, part | Mixing water, part | 1 | 3 | 7 | 28 | 1 | 3 | 7 | 28 |
| | | | | Days after molding | | | | | | | |
| Plain mortar | 100 | 200 | Water 60 | 7 | 20 | 33 | 56 | 34 | 95 | 168 | 302 |
| Polymer-mortar | 100 | 200 | Acrylamide 1.50<br>Sodium acrylate 0.45<br>1,3-Di(methacrylamidomethyl)-2-imidazolidone 0.35<br>β-Dimethylaminopropionitrile 0.24<br>Potassium persulfate 0.30<br>Water 57.2 | 17 | 29 | 41 | 76 | 27 | 76 | 140 | 210 |
| Mortar with polymer and K₂SO₄ | 100 | 200 | 5 Parts of K₂SO₄ was added to the solution of the same proportions as above, and the solution was used for mixing. | 20 | 35 | 48 | 89 | 40 | 110 | 187 | 340 |
| Mortar with polymer and NaWO₄.2H₂O | 100 | 200 | K₂SO₄ was replaced by 5 parts of Na₂WO₄.2H₂O in the above solution, and the solution obtained was used for mixing. | 19 | 33 | 45 | 86 | 38 | 106 | 176 | 328 |

When the strengths of the polymer-mortar are compared with those of the plain mortar (ordinary mortar) in such a case as this Example where mortars are water-cured at ordinary temperature, it is seen that the polymer-mortar is superior in bending strength but considerably inferior in compressive strength to the plain mortar.

On the other hand, it is also seen that when incorporated with an inorganic compound of an alkali metal, such as potassium sulfate or sodium tungstate, the polymer-mortar is improved to a great extent in compressive strength and also to some extent in bending strength compared with the mortar admixed with only polymer.

REFERENTIAL EXAMPLE 1

In Table 6 are shown the strengths of the plain mortar and polymer-mortar of the same proportions as those in Table 5 during the period of atmospheric curing (at 20°C and 65 % humidity).

The molding of the sample was performed in the manner similar to that in Example 4. Twenty four hours after molding, the mold was stripped and the molded specimen was immediately atmosphere-crued to obtain the hardened material.

Table 6

| | Strengths of plain mortar and polymer-mortar during atmospheric curing | | | | | | | |
|---|---|---|---|---|---|---|---|---|
| | Bending strength, kg/cm² | | | | Compressive strength, kg/cm² | | | |
| Kind of mortar | 1 Day after molding | 3 Days after molding | 7 Days after molding | 28 Days after molding | 1 Day after molding | 3 Days after molding | 7 Days after molding | 28 Days after molding |
| Plain mortar | 7 | 15 | 30 | 51 | 30 | 82 | 141 | 210 |
| Polymer-mortar | 19 | 34 | 47 | 90 | 41 | 111 | 182 | 326 |

As is clear from the above table, the polymer-mortar exhibits excellent strength characteristics only by atmospheric curing.

What is claimed is:

1. A process for producing a hardened cement material which comprises curing a cement material composed of a base material consisting of cement or of cement and aggregates; water for mixing the cement material; 2 to 30% by weight (based on the water) of a water-soluble ethenoid monomer; and 0.02 to 20% by weight (based on the water) of a water-soluble cross-linking monomer, with a catalytic quantity of a redox catalyst system in the presence of 2–40% by weight (based on the water) of at least one compound selected from the group consisting of watersoluble alkali metal sulfates and carbonates.

2. A process according to claim 1, wherein the water-soluble inorganic compound of an alkali metal is sodium sulfate.

3. A process according to claim 1, wherein the water-soluble inorganic compound of an alkali metal is sodium carbonate.

4. A process according to claim 2, wherein the water-soluble ethenoid monomer is at least one member selected from the group consisting of acrylamide, N-methylolacrylamide, methacrylamide, N-methylolmethacrylamide, acrylonitrile, hydroxymethyl methacrylate, methacrylic acid and metal salts thereof, and acrylic acid and metal salts thereof.

5. A process according to claim 2, wherein the water-soluble ethenoid monomer is a mixture comprising a major proportion of acrylamide and a minor proportion of at least one member selected from the group consisting of sodium acrylate and sodium methacrylate.

6. A process according to claim 2, wherein the water-soluble cross-linking monomer is at least one member selected from the group consisting of methylenebisacrylamide, 1,3-di(acrylamidomethyl)-2-imidazolidone, 1,3-di(methacrylamidomethyl)-2-imidazolidone, hexahydrotriacryloyltriazine, diacrylamidodimethyl ether, and dimethacrylamidodimethyl ether.

7. A process according to claim 2, wherein the watersoluble cross-linking monomer is at least one member selected from the group consisting of 1,3-di(acrylamidomethyl)-2-imidazolidone and 1,3-di-(methacrylamidomethyl)-2-imidazolidone.

8. A process according to claim 2, wherein the oxidative component of the redox catalyst system is at least one member selected from the group consisting of potassium persulfate and ammonium persulfate.

9. A process according to claim 2, wherein the reducing component of the redox catalyst system is at least one member selected from the group consisting of triethylenetetramine, hexamethylenediamine, dimethylaminopropanol, nitrilotrispropionamide, β-dimethylaminoethanol, β-dimethylaminopropionitrile, β-diketone, and sodium formaldehydrosulfoxylate.

10. A process according to claim 2, wherein the amount of the catalyst is 1 to 30 % by weight based on the polymerizable components.

11. A process according to claim 2, wherein an aqueous solution containing the monomers and the reducing component of the redox catalyst system and an aqueous solution containing the oxidation component of the redox catalyst system and the inorganic compound of an alkali metal are mixed and immediately added to the base material consisting of cement or of cement and aggregates to mix the cement material.

* * * * *

UNITED STATES PATENT OFFICE
CERTIFICATE OF CORRECTION

Patent No. 3,892,704              Dated   July 1, 1975

Inventor(s) EINOSUKE HIGASHIMURA ET AL

It is certified that error appears in the above-identified patent and that said Letters Patent are hereby corrected as shown below:

Please insert the correct name of the assignee at Box. 73 on front of Letters Patent to read as follows:

Assignee:  MITSUBISHI RAYON CO.LTD., Tokyo, Japan

NITTO CHEMICAL INDUSTRY CO.,LTD., Tokyo, Japan

Signed and Sealed this seventeenth Day of February 1976

[SEAL]

Attest:

RUTH C. MASON
*Attesting Officer*

C. MARSHALL DANN
*Commissioner of Patents and Trademarks*